US010142354B2

United States Patent
Murynets et al.

(10) Patent No.: US 10,142,354 B2
(45) Date of Patent: *Nov. 27, 2018

(54) CLOUD-BASED COMMUNICATION ACCOUNT SECURITY

(71) Applicant: AT&T Intellectual Property I, L.P., Atlanta, GA (US)

(72) Inventors: Ilona Murynets, Rutherford, NJ (US); Jeffrey E. Bickford, Somerset, NJ (US); Gustavo De Los Reyes, Fair Haven, NJ (US); Ramesh Subbaraman, Jersey City, NJ (US); Wei Wang, Weehawken, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,227

(22) Filed: Jun. 12, 2017

(65) Prior Publication Data

US 2017/0289177 A1 Oct. 5, 2017

Related U.S. Application Data

(63) Continuation of application No. 14/337,808, filed on Jul. 22, 2014, now Pat. No. 9,680,843.

(51) Int. Cl.
*G06F 21/56* (2013.01)
*H04L 29/06* (2006.01)
*G06F 11/36* (2006.01)

(52) U.S. Cl.
CPC ...... *H04L 63/1408* (2013.01); *H04L 63/1433* (2013.01)

(58) Field of Classification Search
None
See application file for complete search history.

(56) References Cited

U.S. PATENT DOCUMENTS

| 6,327,579 | B1 | 12/2001 | Crawford |
| 6,347,375 | B1 | 2/2002 | Reinert et al. |
| 6,470,453 | B1 * | 10/2002 | Vilhuber ............... G06F 21/577 |
| | | | 709/225 |
| 6,856,950 | B1 * | 2/2005 | Abts ................... G06F 17/5022 |
| | | | 703/13 |
| 7,237,264 | B1 * | 6/2007 | Graham ............. H04L 63/1416 |
| | | | 726/23 |
| 7,274,932 | B1 | 9/2007 | Iyer |

(Continued)

FOREIGN PATENT DOCUMENTS

WO  WO 2014123314 A1  8/2014

OTHER PUBLICATIONS

A Generic Intrusion Detection and Diagnoser System Based on Complex Event Processing. Ficco et al. IEEE. (Year: 2011).*

(Continued)

*Primary Examiner* — Venkat Perungavoor
(74) *Attorney, Agent, or Firm* — Hartman & Citrin LLC

(57) ABSTRACT

A request is received over a network to resolve a problem relating to a networked user device. The request is accepted in order to provide user service. Based on the request, one of multiple available diagnostic algorithms is selected to analyze user data related to a user's account to identify symptoms of the problem and diagnose a cause of the symptoms identified.

11 Claims, 12 Drawing Sheets

(56) References Cited

U.S. PATENT DOCUMENTS

| | | | |
|---|---|---|---|
| 7,302,706 B1 | 11/2007 | Hicks | |
| 7,930,734 B2 | 4/2011 | Foo | |
| 8,248,928 B1* | 8/2012 | Wang | H04L 43/026 370/230 |
| 8,320,904 B1 | 11/2012 | Celentano et al. | |
| 8,453,244 B2 | 5/2013 | Dai et al. | |
| 8,526,940 B1 | 9/2013 | Chowdhury et al. | |
| 8,528,086 B1* | 9/2013 | Aziz | H04L 63/1425 726/23 |
| 8,595,794 B1* | 11/2013 | Van | H04L 67/141 380/247 |
| 9,075,802 B2 | 7/2015 | Davis | |
| 2003/0192033 A1 | 10/2003 | Gartside | |
| 2003/0225549 A1 | 12/2003 | Shay | |
| 2004/0168085 A1* | 8/2004 | Omote | H04L 29/06 726/25 |
| 2005/0172141 A1 | 8/2005 | Gayde et al. | |
| 2006/0156086 A1 | 7/2006 | Flynn | |
| 2007/0027893 A1 | 2/2007 | Gundy | |
| 2007/0197206 A1 | 8/2007 | Olson | |
| 2007/0261112 A1* | 11/2007 | Todd | G06F 21/577 726/11 |
| 2008/0066145 A1* | 3/2008 | Molen | H04L 12/2814 726/1 |
| 2008/0155091 A1 | 6/2008 | Gokhale | |
| 2008/0250356 A1 | 10/2008 | Johns | |
| 2009/0075648 A1 | 3/2009 | Reed | |
| 2009/0313699 A1* | 12/2009 | Jang | G06F 21/52 726/23 |
| 2010/0031361 A1 | 2/2010 | Shukla | |
| 2010/0246412 A1 | 9/2010 | Washam | |
| 2011/0173698 A1 | 7/2011 | Polyakov | |
| 2011/0247071 A1 | 10/2011 | Hooks | |
| 2012/0208562 A1 | 8/2012 | Wilkin | |
| 2012/0215492 A1 | 8/2012 | Masurkar | |
| 2012/0278477 A1 | 11/2012 | Terrell | |
| 2012/0322439 A1 | 12/2012 | Ding et al. | |
| 2013/0290507 A1 | 10/2013 | Drooghaag | |

OTHER PUBLICATIONS

Research on the Remote Monitoring and Intelligent Fault Diagnosis System. Zhao et al. IEEE. (Year: 2008).*
Intrusion Detection in MANET using Fuzzy Logic. Wahengbam et al. IEEE. (Year: 2012).*
Automatic Diagnosis and Response to Memory Corruption Vulnerabilities . Xu et al. ACM. (Year: 2005).*
Quickly Finding Known Software Problems via Automated Symptom Matching. Brodie et al. IEEE. (Year: 2005).*
U.S. Office Action dated Oct. 19, 2015 in U.S. Appl. No. 14/337,808.
U.S. Office Action dated Mar. 24, 2016 in U.S. Appl. No. 14/337,808.
U.S. Office Action dated Sep. 13, 2016 in U.S. Appl. No. 14/337,808.
U.S. Notice of Allowance dated Jan. 31, 2017 in U.S. Appl. No. 14/337,808.

* cited by examiner

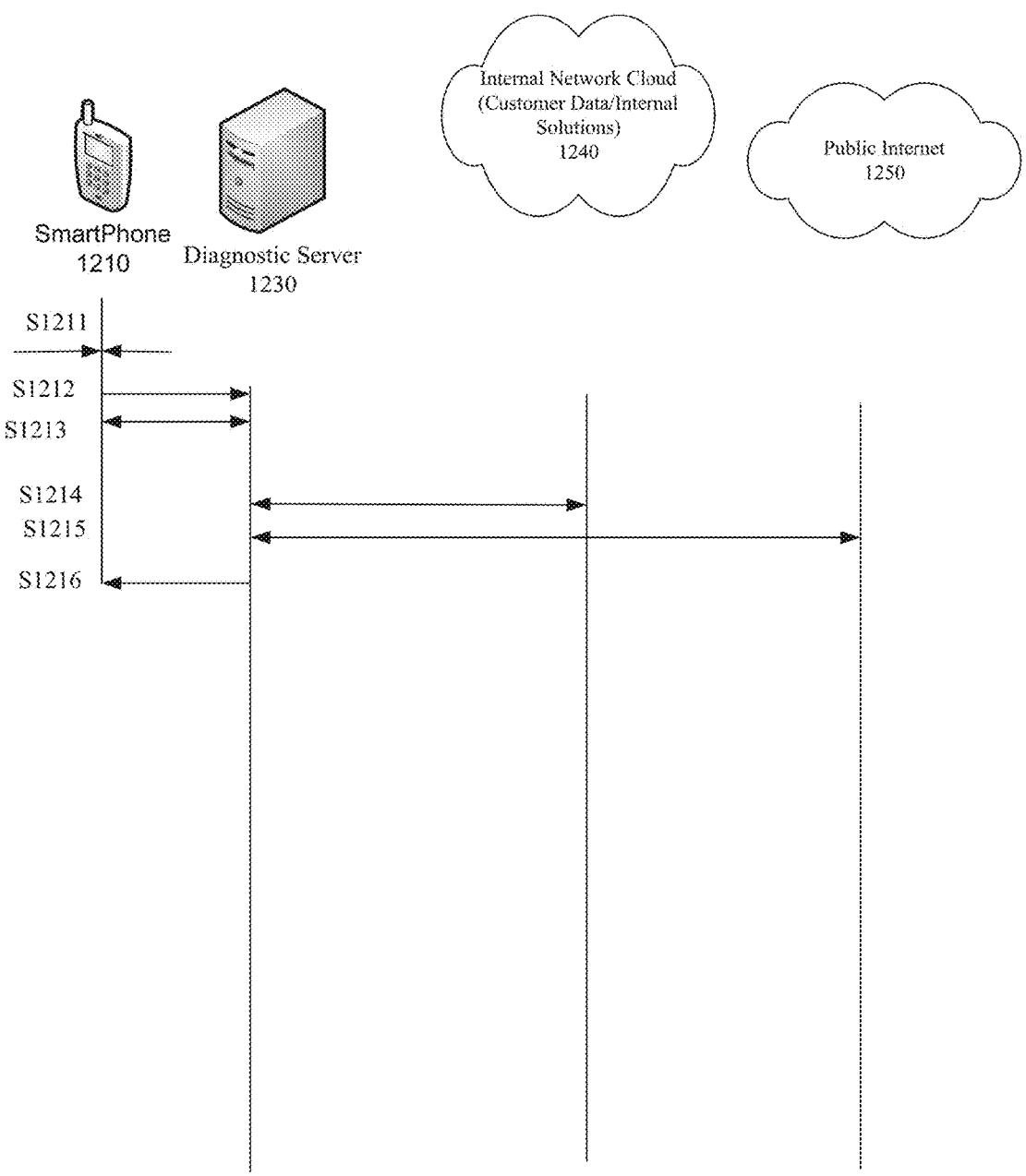

CLOUD-BASED COMMUNICATION ACCOUNT SECURITY

CROSS-REFERENCE TO RELATED APPLICATIONS

This application is a continuation of U.S. patent application Ser. No. 14/337,808, entitled "Cloud-Based Communication Account Security," filed Jul. 22, 2014, now U.S. Pat. No. 9,680,843, which is incorporated herein by reference in its entirety.

BACKGROUND

Field of the Disclosure

The present disclosure relates to the fields of communication services and account security. More particularly, the present disclosure relates to diagnosing and resolving security problems for compromised communication accounts.

Background Information

Users call customer service lines for many types of problems. Security problems involving potentially compromised accounts may be difficult to diagnose and resolve based solely on user feedback, even when users fully and honestly answer all questions posed by a customer service representative (or customer care agent). For example, a user may not possess the information necessary to diagnose and resolve a security problem. A customer care agent may also lack access or knowledge necessary to resolve a security problem. As a result, when an agent cannot provide a proper resolution to a user, the agent may be faced with a choice to credit a user account, send out a replacement device, or suggest a device reset. When the agent cannot provide a proper resolution or compensation/credit, users may be left unsatisfied.

BRIEF DESCRIPTION OF THE DRAWINGS

FIG. 12 shows a call flow for cloud-based communication account security, according to an aspect of the present disclosure.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
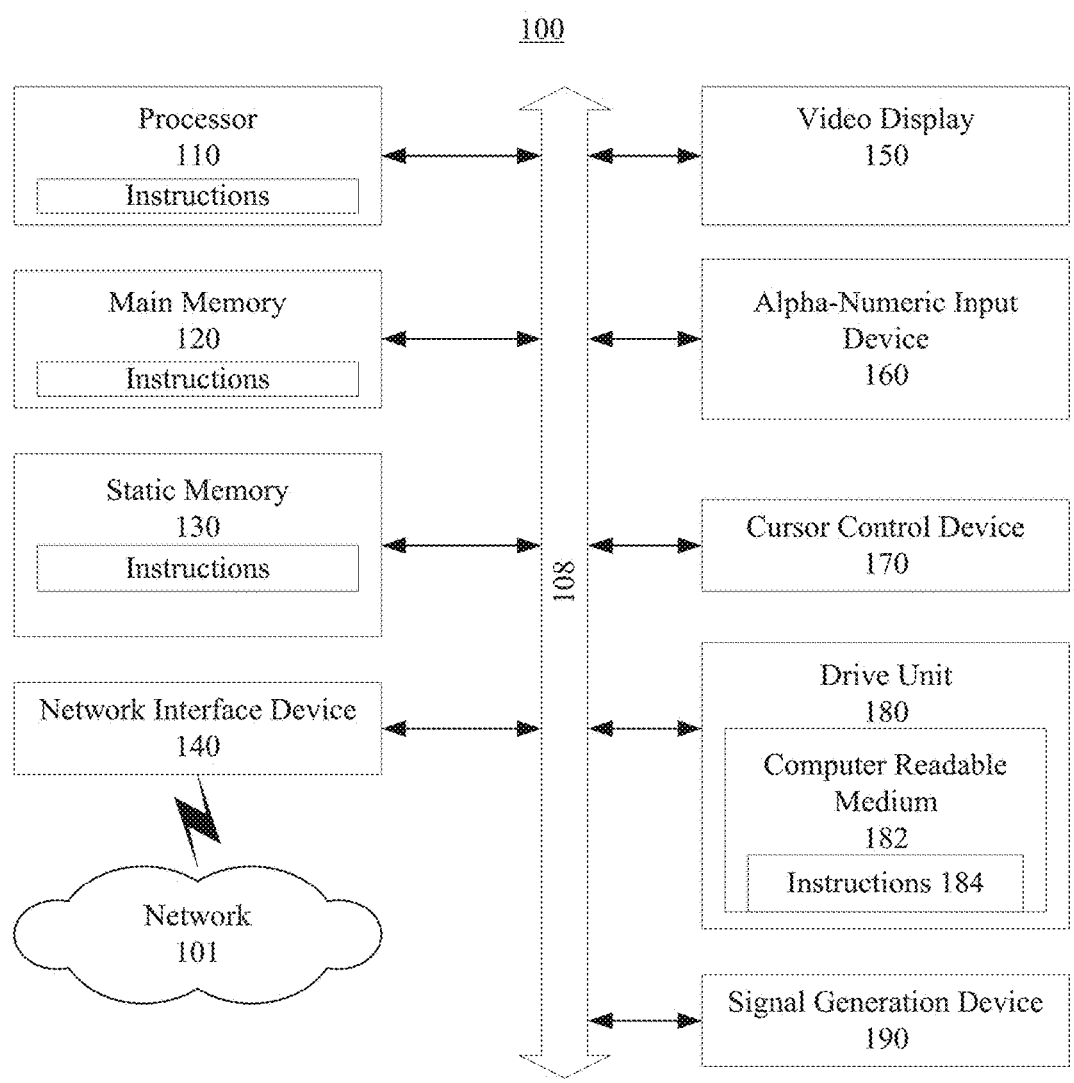
FIG. 1 shows an exemplary general computer system that includes a set of instructions for cloud-based communication account security.

FIG. 1 is an illustrative embodiment of a general computer system, on which a method of cloud-based communication account security can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a global positioning satellite (GPS) device, a communication device, a control system, a web appliance, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
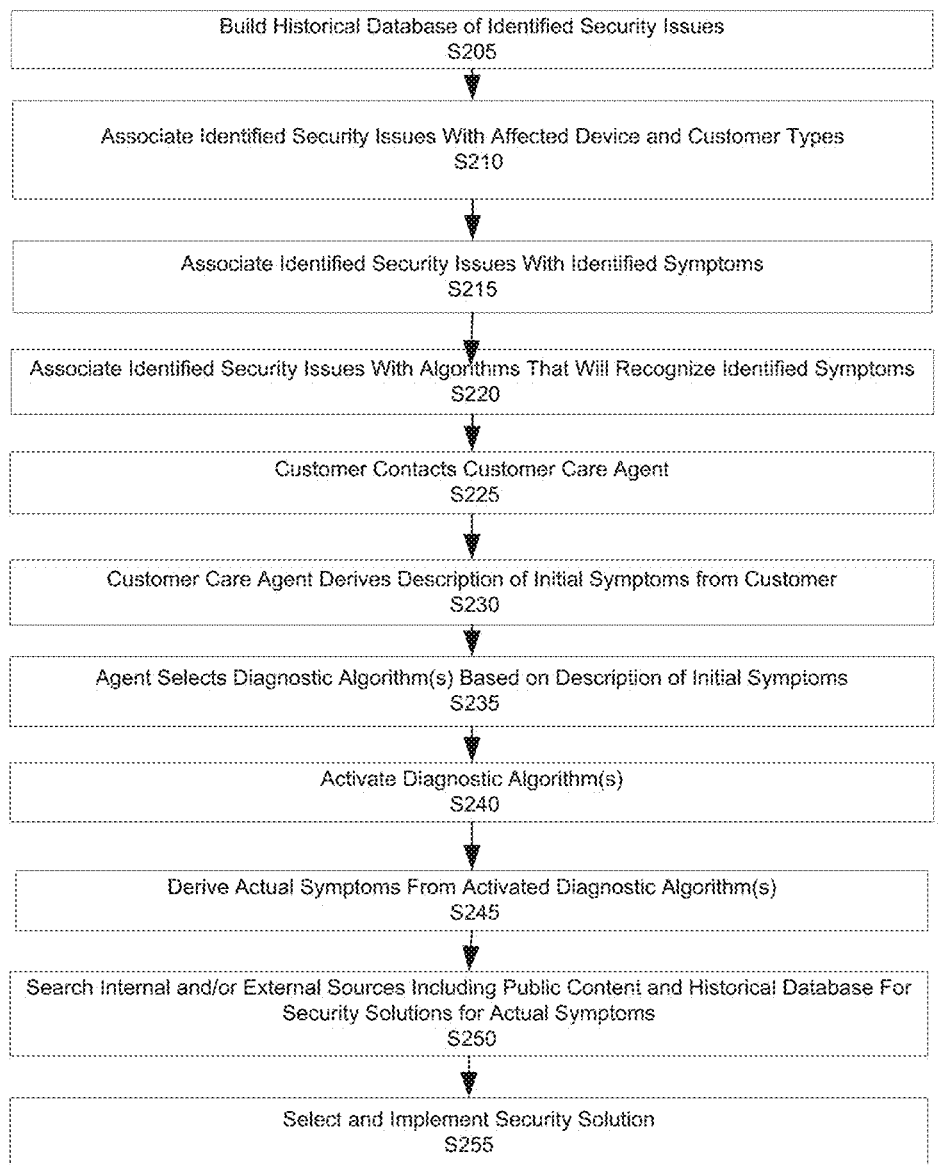
FIG. 2 shows a method for cloud-based communication account security, according to an aspect of the present disclosure.

FIG. 2 shows a method for cloud-based communication account security, according to an aspect of the present disclosure. The method of FIG. 2 includes background actions that might occur before a particular user has any problems, concerns, or issues with a particular device or a particular application on a device. In the method of FIG. 2, a historical database of identified security problems is built at S205. The historical database may be built with fields for a.) particular device types, b.) operating systems, c.) device manufacturer, d) particular applications that run on devices, e.) particular symptoms of security problems that may be identified by users or a diagnostic algorithm, f.) particular identified security problems that can cause symptoms, and g.) particular algorithms that can be used to identify known symptoms of known security problems. In this way, a set of data such as a device type, operating system, device manufacturer, application(s) on the device, symptoms identified and described by the user, and so on, can result in the selection of one of multiple available diagnostic algorithms so that the service provider can identify actual symptoms. Once the actual symptoms are identified and/or confirmed by the service provider, the problem most likely to cause the actual symptoms can be identified along with a solution to the problem.

Symptoms as described herein are observable features of a device that may be the cause of, or characteristic of, a problem. These symptoms can be observed via the network, on the device, or via the combination of the two.

A user as described herein may be the customer(s) responsible for paying a service provider such as a telecommunications or internet service provider for an account under the name of the customer. The user may also be a party on an account under another's name. The user may also be a party using a device that belongs to another. Accordingly, the terms "user" and "customer" are not synonymous as used herein, as a user of a user device may or may not be the customer responsible for the service accounts for the user device, and a customer may or may not be a user of a user device under the service account(s) of the user device.

At S210, identified security problems are correlated with particular device types and particular customer types. As explained below, identified security problems can also be correlated with operating systems, device manufacturers, characteristics of users, applications that run on devices, symptoms of the security problems, algorithms that can be used to identify known symptoms of the security problems, and so on. The historical database built in FIG. 2 is built using, for example, instances of solved/resolved security problems, and information correlated at S210 is correlated so that future instances of the problems can be identified and solved/resolved quickly. In this way, characteristics of the device and user may be used to select the particular algorithms that will identify actual symptoms of the problem, and ultimately the problem itself along with a solution. The characteristics of users may include characteristics of particularly vulnerable users for particular types of security problems, such as elderly people and preteens, or people using their first smartphone.

At S215, identified security issues (e.g., security problems such as vulnerabilities, malware, etc.) are associated with identified symptoms. In this way, symptoms of an issue are associated with the issue itself, so that the symptoms can be properly diagnosed later.

At S220, identified security issues are associated with algorithms that will recognize and confirm the identified symptoms. In this way, an algorithm may be constructed (e.g., written) so as to systematically narrow symptoms and characteristics of a security problem to the actual security problem itself.

At S225, a user contacts a customer care agent. This contact at S225 is the initial step for a particular user who is encountering symptoms that are likely caused by a security issue. S225 may be from a user complaining about a high bill, device operation, and so on.

At S230, the customer care agent derives a description of the initial symptoms from the user. The description may include a large amount of charges for voice or data or messaging services, or an application that is downloading content outside of the control of the user, or communications that are being sent or received outside of the control and consent of the user. A variety of such symptoms that can be recognized by a user are described herein. As will be understood, users may encounter many different recognizable symptoms, even in circumstances where they have to be prompted for information, before realizing that they are victims of a security issue.

Based on the symptoms provided by the user, the customer care agent selects a diagnostic algorithm at S235. In this way, the correlations set at S210, S215 and S220 can be used by a customer care agent to select diagnostic algorithms that will sort through service provider data for the device, account, applications etc., and search for symptoms recognized by the cloud-based communication account security system as being symptoms of diagnosed security problems. Service provider data is mostly network data, but can also be data on the device as well.

These symptoms may differ from the symptoms provided by the user and in fact may be symptoms that are not within view of the user, such as symptoms derived from the "big data" of all communications involving the device, an application on the device, or an account used by the device. Therefore, these diagnostic algorithms provide an analysis of actual symptoms.

Along with the service provider data, the system can be integrated to analyze any number of multiple different data sources such as data from an application on the device and other data from third party services. The size of the data being analyzed can vary depending on the dataset. In many cases, service provider data and the algorithms that use it can be considered "big data". Throughout the rest of this application, the generic term "data" is used though in many cases this may be utilizing big data infrastructure and techniques.

At S240, diagnostic algorithms are activated. The activated diagnostic algorithm may be one or more than one algorithm that was selected by the customer care agent based on the description of symptoms provided by the user.

At S245, actual symptoms are derived from the activated diagnostic algorithms. Actual symptoms may include information not particularly known by the user, such as communications to or from suspicious addresses or known sources of, e.g., viruses. Actual symptoms may also be identification of applications or other types of programs that are known to present security vulnerabilities, such as if a user has unknowingly downloaded one vulnerable application thinking it is another (safe) popular application. Actual symptoms may also be volumes of communications, or particular types of communications, or times of communications. Actual symptoms may also be vulnerable passwords, user IDs, security confirmation codes, usernames or the like for applications that are the source of concerns. Of course, the actual symptoms may fully or partially match the initial symptoms provided by the user, such as when the user is savvy and recognizes exactly the same problems that will be recognized by a diagnostic algorithm.

At S250, internal and/or external sources are searched, including public content and historical databases. The search of sources is for security solutions of actual symptoms recognized by the diagnostic algorithms. In this way, a user may be told to visit a website to repair a downloaded application. Of course, the user may also be told to change a password, remove an application, and so on.

At S255, a security solution is selected and implemented. The solution can be based on the historical data mentioned in S250 or can be a new solution developed for a previously unknown problem. Though not shown in FIG. 2, a diagnostic algorithm may be re-run again after S255, in order to ensure symptoms have disappeared. Additionally, although not shown, a user may be asked to re-contact the customer care agent at a later time or even date to "walk through" a device and applications to ensure the initial symptoms provided by the user no longer appear.

As a result of the diagnostic algorithms and overall cloud-based communication account security provided herein, a service provider may avoid having to replace devices. The service provider may also help users avoid charges that the users may be particularly unwilling and/or unlikely to pay, such as if the users believe the service provider is responsible for security vulnerabilities.

Figure 3:
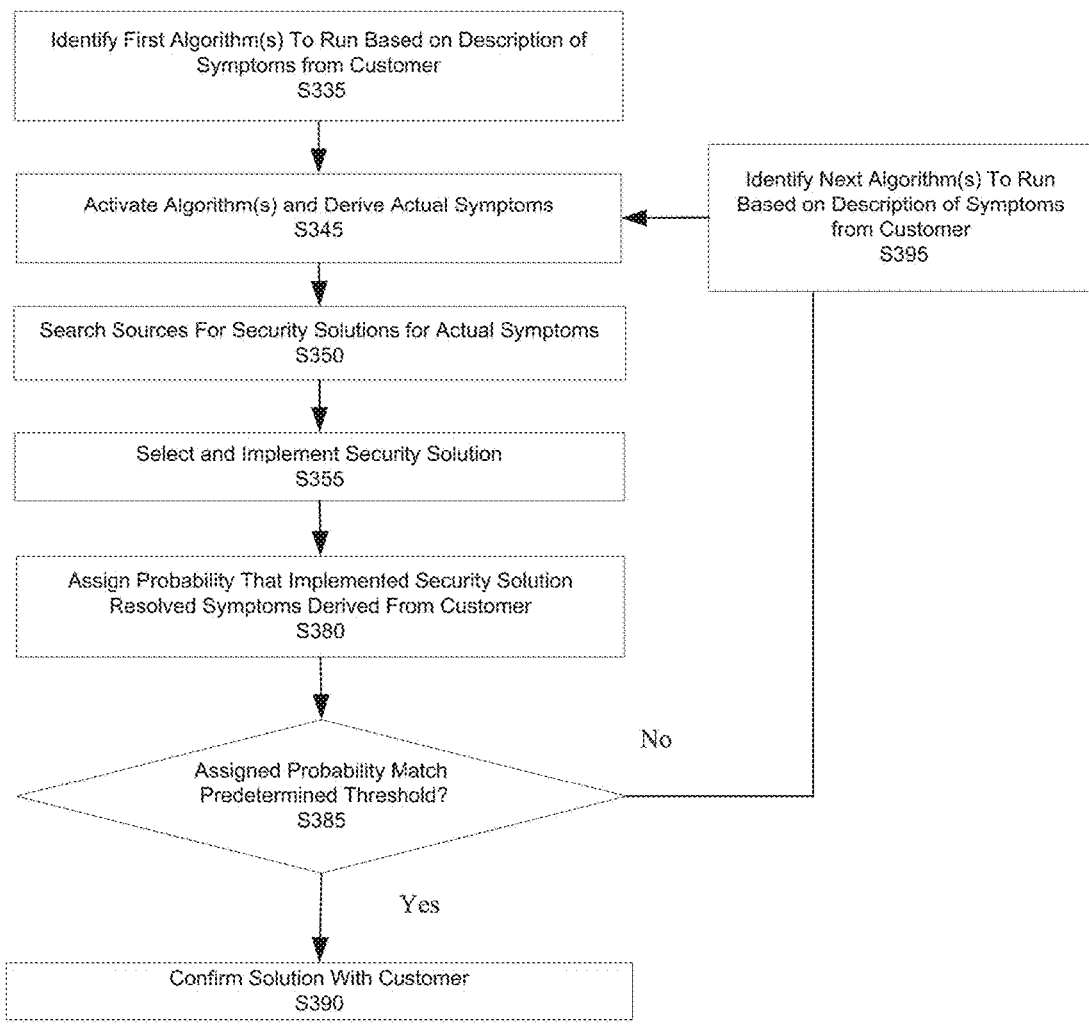
FIG. 3 shows a method for cloud-based communication account security, according to an aspect of the present disclosure.

FIG. 3 shows a method for cloud-based communication account security, according to an aspect of the present disclosure. In the embodiment of FIG. 3, an algorithm is automatically selected based on a description from a user, and solutions implemented based on the algorithm are later checked so as to see if another algorithm should be selected. That is, in the embodiment of FIG. 3, an implemented security solution is assigned a probability as to whether it will resolve (or has resolved) the symptoms originally derived from the user.

At S335, a first algorithm or algorithms is/are identified based on the description of symptoms from the user. In this way, the user's identification of symptoms is used as first-stage symptoms in order to select one or more than one algorithm. Multiple algorithms can be run sequentially or simultaneously, such as when multiple potential diagnoses are pre-identified as likely causes of one or more symptoms, and the user describes such symptoms while in contact with the customer care agent or directly to the system without additional human involvement.

At S345, the selected algorithm(s) are activated. When run, the activated algorithms actually are searching for true symptoms, before any cause or solution to the symptoms is identified. The symptoms identified at S345 are used as second-stage symptoms. The symptoms identified by an algorithm may be partly or entirely different from those provided by the user. Further, the algorithms may be used to search through large amounts of data, such as service provider data that describes all, most or even just much activity involving the user. The internal data that may be searched by an algorithm may also involve other users, and not just the user contacting customer care, such as data for other users on the user's account, or others with similar demographic, behavior, or device profiles.

At S350, sources are searched for security solutions for the actual symptoms identified by the algorithms. For example, a solution to an application that is sending large numbers of communications to addresses based on, e.g., instructions from outside the user device, may be to block any instructions to the application from any external source, or may be to delete the application on the user device and/or to reinstall the application on the user device. The sources may be an internal service provider database that stores correlations between symptoms and other characteristics (device or user or account characteristics) such as those described with respect to FIG. 2. Sources searched for solutions may also include external private sources such as third party security vendor sources, or may be external public sources available on the public internet.

At S355, a security solution is selected and implemented. The selected security solution may require specific cooperation or approval from the user in order to be implemented, or may be implemented based on pre-authorization from the user so as not to require the user to do anything else. The security solutions may involve blocking source and/or destination addresses for communications, requiring a changed username, user ID, security confirmation code, password or the like for an application, requiring removal of an application, requiring a factory reset for a device, or simply approving an update to an application so as to allow a device or application provider to update security features of the device or application.

At S380, a probability that an implemented security solution resolves symptoms derived from the user is assigned. For example, a solution may be assigned a 70% likelihood that it will resolve a particular set of symptoms, based on past experiences for users with the same or similar symptoms. When a solution does not meet a threshold, such as 50% or 95% likelihood, a determination is made at S385 to identify additional algorithms at S395 to run/activate again at S345. If the solution does meet a threshold at S385, the solution is confirmed with the user at S390. Of course, if the solution is not satisfactory with the customer care agent or the user at S390, the process may be restarted to gain more information about the symptoms described by the user in order to run/execute different algorithms and identify a better solution.

Figure 4:
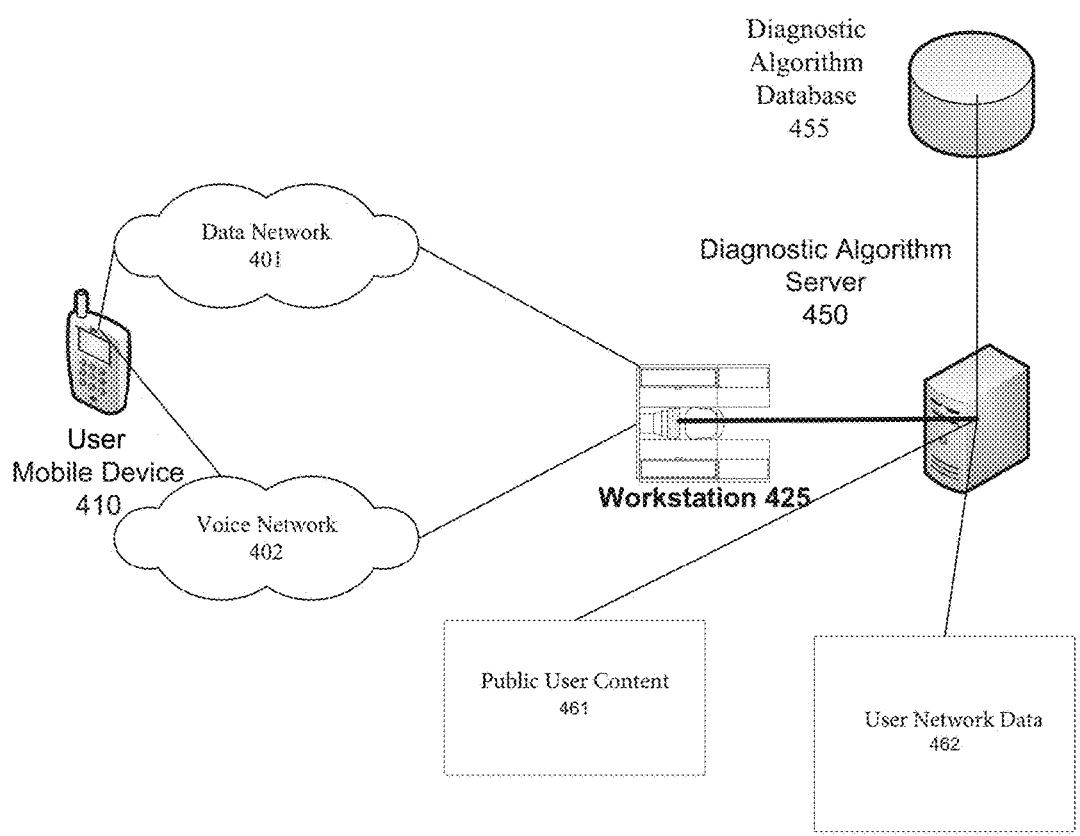
FIG. 4 shows a network using a human (diagnostic) agent for cloud-based communication account security, according to an aspect of the present disclosure.

FIG. 4 shows a network using a human (diagnostic/customer care) agent for cloud-based communication account security, according to an aspect of the present disclosure. In the embodiment of FIG. 4, a traditional human agent at an agent workstation 425 may be provided in, e.g., a call center at a single site or in a distributed network of human agents. The agent at agent workstation 425 is able to receive voice calls via the traditional telephony network or via, e.g., voice over internet protocol (VoIP). The agent at agent workstation 425 is also able to identify and send algorithms at the diagnostic algorithm database 455 to, e.g., the user mobile device 410 and/or to and/or from the diagnostic algorithm server 450. The algorithm may search through data and information on the user mobile device 410, or search through the user network data 462 and/or the public user content 461. As noted previously, user network data 462 may be voluminous data such as all, or nearly all, communication data involving a particular user mobile device 410, user using a particular user mobile device 410 (i.e., including communications from other devices), and/or account that includes the user mobile device 410 (i.e., and may include other users using other user devices whether stationary or mobile). In some cases, data can be correlated across different users of different accounts to enhance the diagnostic algorithms. User network data 462 and public user content 461 is data that may be stored in a database, a network of databases, in a cloud of distributed configurable memories, or even in the public internet or a private restricted internet.

In the embodiment of FIG. 4, the user using the user mobile device 410 calls the human customer care agent at workstation 425 via a voice network 402. The voice network 402 may include wide area cellular mobile networks, dedicated connections, and any other known mediums for carrying voice communications from a sending device to a receiving device. A data network 401 is also provided so that data such as an application or algorithm can be sent from the workstation 425 indirectly or directly from the diagnostic algorithm server 450 at the command of the agent at the workstation 425. The algorithm can be selected and sent at the instruction of the agent based on a description of symptoms provided by the user using the user mobile device 410. The algorithm may search through the user mobile device 410 to categorize installed applications, communications involving one or more applications on the user mobile device 410 (including counterparty addresses, times, dates). The algorithm may also attempt to certify that each application is safe, in the sense that a service provider may have pre-approved the application. The algorithm may also check passwords, usernames, device identifiers, email, and other sensitive and personal information stored on the user mobile device 410 to try and ensure they would not be easily compromised. The algorithm may also identify applications with sensitive permissions/capabilities such as sending SMS messages or phone calls. Network data such as Call Detail Records can be correlated against SMS/Voice records on the device itself to identify anomalies or rogue SMS/Voice messages. The algorithms on the device can also identify applications with high data, memory, CPU, and battery utilization/usage.

The algorithm may also be sent from the diagnostic algorithm server 450 to search through the user network data 462 or public user content 461. Public user content 461 can be checked to see whether the user's accounts, outside of the specific service provider account for the user mobile device, have been compromised or are being misused.

Figure 5:
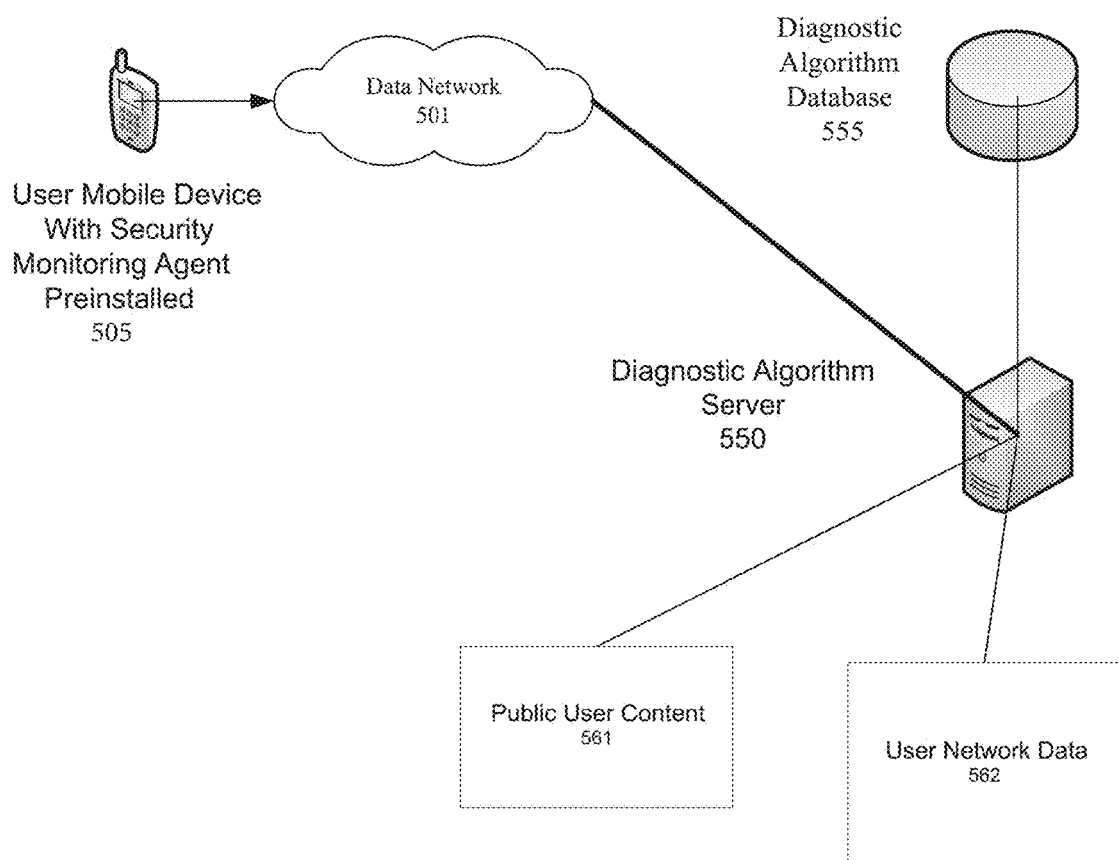
FIG. 5 shows a network using an automated (diagnostic) agent for cloud-based communication account security, according to an aspect of the present disclosure.

FIG. 5 shows a network using an automated (diagnostic) agent for cloud-based communication account security, according to an aspect of the present disclosure. In the embodiment of FIG. 5, compared to the embodiment of FIG. 4, there is no human agent or agent workstation 425. In FIG. 5, a security monitoring agent may be preinstalled on user mobile device 505. The security monitoring agent may monitor communications to and from the user mobile device 505, so as to identify incidents that reflect potential compromises. When a potential compromise is identified, such as when a large volume of identical communications are sent to different addresses from the user mobile device 505, the security monitoring agent notifies the diagnostic algorithm server 550 across data network 501. In this way, the diagnostic algorithm server 550 can analyze the symptoms identified by the security monitoring agent, and then select a diagnostic algorithm from diagnostic algorithm database 555. The user may also submit a request or set of symptoms via the security monitoring agent to trigger this activity. In many cases, network algorithms may be running all the time and in the background. Some algorithms may require more information from the device and the on-device security monitoring agent can be polled from the network.

The algorithm(s) used in FIG. 5 are described herein in a similar or identical manner as the algorithm(s) used in FIG. 4. That is, the algorithm(s) may be sent to the user mobile device 505, and/or to search through public user content 561 and/or user network data 562. Based on the searches by the algorithm, actual symptoms can be identified and then matched to known problems and vulnerabilities. In this way, in FIG. 5, a user using the user mobile device 505 may give pre-authorization for the security monitoring agent, and then may only be notified of a problem once the user needs to take action to correct an identified known vulnerability. That is, a user may, from time to time, be asked to agree to install or uninstall an application, or update a password or username, based on the security monitoring agent in FIG. 5. The security monitoring agent may help a service provider avoid instances where malware misuses a user mobile device 505 for an extended period of time before a user can recognize a problem and contact a customer care agent.

Figure 6:
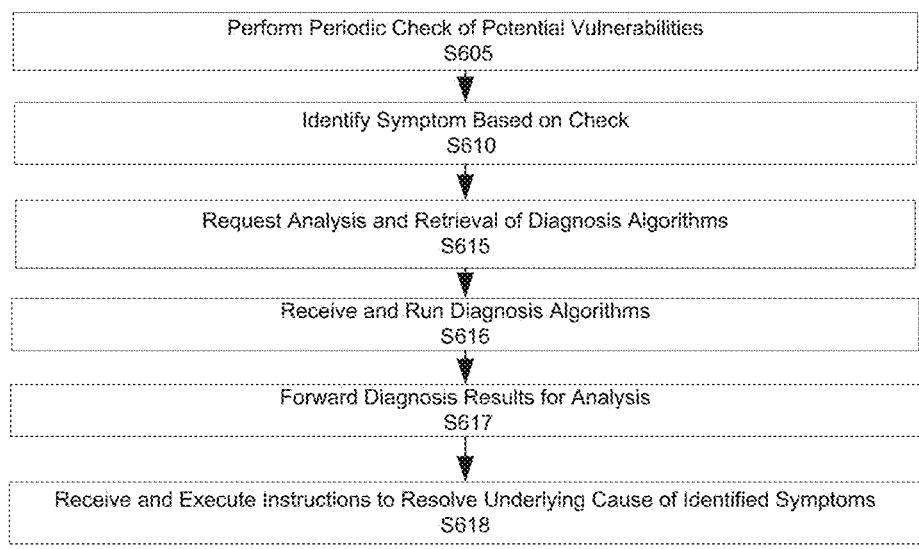
FIG. 6 shows a method for cloud-based communication account security, according to an aspect of the present disclosure.

FIG. 6 shows a method for cloud-based communication account security, according to an aspect of the present disclosure. In FIG. 6, a periodic check is performed for potential vulnerabilities and problems. A periodic check as in FIG. 6, may be performed by a pre-installed security agent on a user device, or may be performed by an algorithm that checks user data held only by the service provider. For example, an algorithm may be provided to sort through user data for all users of a service provider, users who subscribe to a security service, or users who have had security issues previously. Alternatively, a pre-installed security agent may periodically check recent communications, recent installations of applications, recent changes of passwords or usernames, and other new or changed information relating to the user communication device. A periodic check may be performed, for example, once a day, once a week, once a month, once every six months, or once a year.

Alternatively, the check may not be periodic, and may instead be at the direction of the service provider, such as when new threats are identified. In this case, an algorithm may be provided or updated with instructions specifically to check for a certain application, communications to or from certain addresses, and other specific information. The periodic check could also be triggered by the user via the security monitoring agent.

At S610, symptoms are identified based on the check. At S615, analysis and retrieval of a diagnostic algorithm or algorithms is requested. In S615, a particular diagnostic algorithm may be requested based on the results of a check. The particular diagnostic algorithm may be pre-identified for particular types of known problems, and when the known problem is identified as a symptom based on the periodic check at S605, the particular diagnostic algorithm may be requested. As noted throughout, the diagnostic algorithm may check for data on the user communication device or for back end data held by the service provider or other types of data such as public social network data of the user or email accounts of the user.

At S616, the diagnostic algorithm is received and performs an analysis. At S617, the diagnostic results obtained from running the algorithm may be forwarded. At S618, instructions are received and executed so as to resolve the underlying cause of identified symptoms. For example, an application may be uninstalled, reinstalled, or updated. A username or password may be changed. A setting on the user communication device may be changed, such as to block the use of any third-party "open" private networks for communications.

Figure 7:
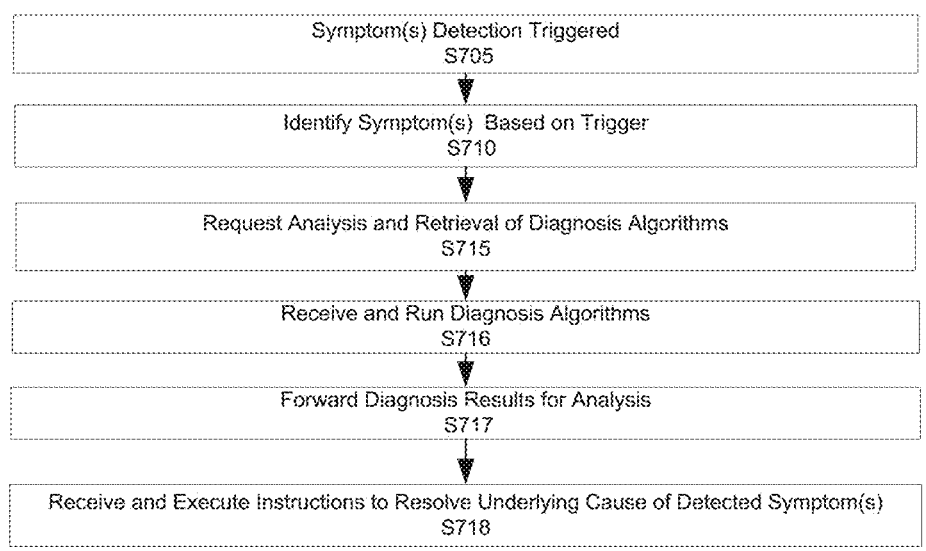
FIG. 7 shows a method for cloud-based communication account security, according to an aspect of the present disclosure.

FIG. 7 shows a method for cloud-based communication account security, according to an aspect of the present disclosure. In FIG. 7, symptoms are detected, resulting in a trigger being triggered at S705. The trigger may result in an automated communication, an alarm, an initiation of a software protocol, or temporarily shutting down an application or communications for a particular application. The immediate result of the trigger may vary based on which symptoms are detected.

At S710, symptoms are identified based on the trigger. The symptoms may be a collection of which symptoms were initially detected, and may also include results of an immediate check for additional symptoms.

At S715, analysis and retrieval of diagnostic algorithms is requested. At S716, one or more diagnostic algorithms may be received and run. At S717, diagnosis results are forwarded for analysis. At S718, instructions to resolve the underlying cause of detected symptom(s) are received and executed.

Examples of symptoms include potential malware behaviors. Malware behaviors include causing excessive data traffic, such as when a compromised email account is used to send spam, making unauthorized calls, or sending unauthorized texts, stealing login credentials (phishing apps), turning devices into bots, spying, tracking GPS location, forwarding simple message service (SMS) messages, emails and pictures, leaking device information, such as international mobile station equipment identity (IMEI), draining battery, causing denial of service on the network or device, manipulating machine to machine (M2M) devices, or causing aggressive ad networks experience. Any or all of these and even other symptoms may be described initially by a user or automated security agent, and may be detected by a diagnostic algorithm.

Figure 8:
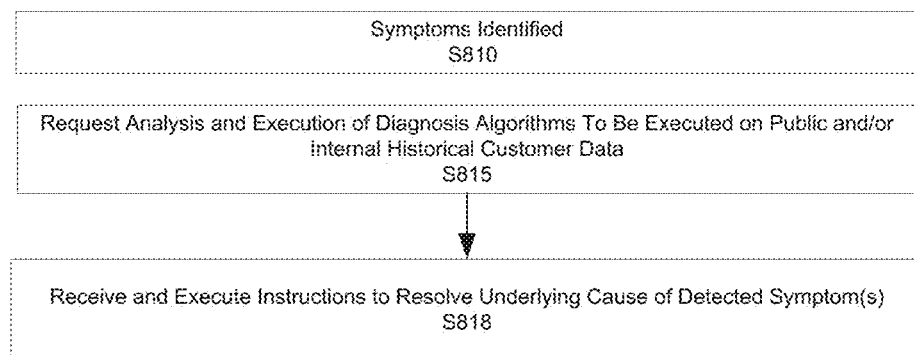
FIG. 8 shows a method for cloud-based communication account security, according to an aspect of the present disclosure.

FIG. 8 shows a method for cloud-based communication account security, according to an aspect of the present disclosure. In FIG. 8, symptoms are identified at S810. At S815 a request is sent for analysis and execution of diagnostic algorithms to be executed on public and/or internal historical user data. S815 is shown to specifically request that an algorithm is run on internal service provider user data or external public user data for the user, in either event to identify actual symptoms that may result from a security vulnerability relating to a user communication device. At S818, instructions to resolve an underlying cause of detected symptoms is received and executed.

Figure 9:
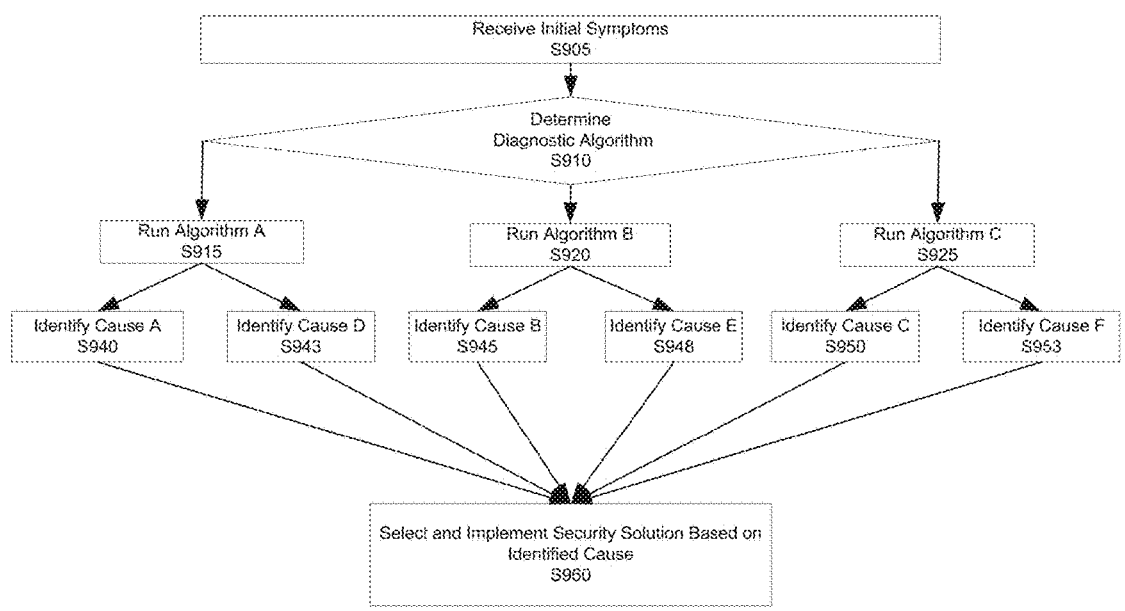
FIG. 9 shows a method for cloud-based communication account security, according to an aspect of the present disclosure.

FIG. 9 shows a method for cloud-based communication account security, according to an aspect of the present disclosure. In FIG. 9, initial symptoms are received at S905 from a user/users. At S910, a diagnostic algorithm is determined by a human agent or an automated system. In FIG. 9, diagnostic algorithms include Algorithm A, which can be run at S915, Algorithm B, which can be run at S920, and Algorithm C, which can be run at S925. Algorithm A can identify causes A and D as causes of actual symptoms recognized by algorithm A. Algorithm B can identify causes B and E as causes of actual symptoms recognized by Algorithm B. Algorithm C can identify causes C and F as causes of actual symptoms recognized by Algorithm C. When causes A, B, C, D, E or F are identified at S940, S943, S945, S948, S950 or S953, a security solution is selected and implemented based on the identified cause at S960.

In FIG. 9, the second identification of actual symptoms is not detailed, though this would occur when running algorithms A, B or C at S915, S920 or S925. Furthermore, as a general matter, FIG. 9 shows that different algorithms can be dynamically selected based on identification of initial symptoms described by a user. Further, causes can be identified by the algorithms, and the causes may be entirely different and even may be uniquely identifiable based on identification of actual symptoms that are identified/identifiable by only one or only a few algorithms in a set of many algorithms that are available for use.

Numerous different algorithms can be used to detect or partially detect different malware behavior from network data. These algorithms include: individual detection algorithms such as data usage anomaly detection, blacklist/whitelist analysis, spam reports/blacklists, IP reputation for unknown IP addresses, new domain detection, Android application file package sandbox analysis, short message service relay algorithm, device related information detection based on signatures, SIMbox fraud detection, network detection change behavior, contact-based behavior change behavior, connect-disconnect algorithm, and social media crawling. A few of these individual detection algorithms are described below.

A data usage anomaly detection algorithm detects volumetric changes in IP traffic and detects destination changes in IP traffic. A Blacklist/Whitelist analysis algorithm checks whether there are flows to blacklisted/whitelisted domains and IP addresses. A spam reports/blacklists algorithms detect spammers. An IP Reputation algorithm checks the reputation of unknown IP addresses. A new domain detection algorithm detects newly registered domains. An APK Sandbox analysis algorithm is based on APK features, and calculates a probability that an application is malicious. A SMS Relay algorithm checks if sensitive incoming SMSs (such as bank authentication messages) are automatically forwarded to a third party. A device related information detection algorithm is based on signatures. A SIMbox fraud detection algorithm checks if a device is behaving as a SIMbox. A network behavior change detection algorithm checks for changed behaviors. A contact-based behavior change detection algorithm detects, e.g., if anomalously large amounts of SMSs are being sent to new recipients. A Connect-Disconnect algorithm detects devices that switch from idle to connected state in a way that can harm the network. A social media crawling algorithm crawls through social media accounts of a user for phone numbers, domains and IPs to check for addresses reported as malicious/fraudulent. As noted previously, any of these or other individual algorithms can be selected based on an initial description of symptoms from a user.

Additionally, group detection algorithms include spam content similarity, clustering group behavior, P2P botnet detection, and M2M anomaly detection. A spam content similarity algorithm detects when a device generates abnormally large amounts of SMSs with similar contents. A clustering group behavior algorithm detects clusters of users showing similar anomalies. An M2M anomaly detection detects abnormal behavior in machine to machine IP and SMS traffic.

Figure 10:
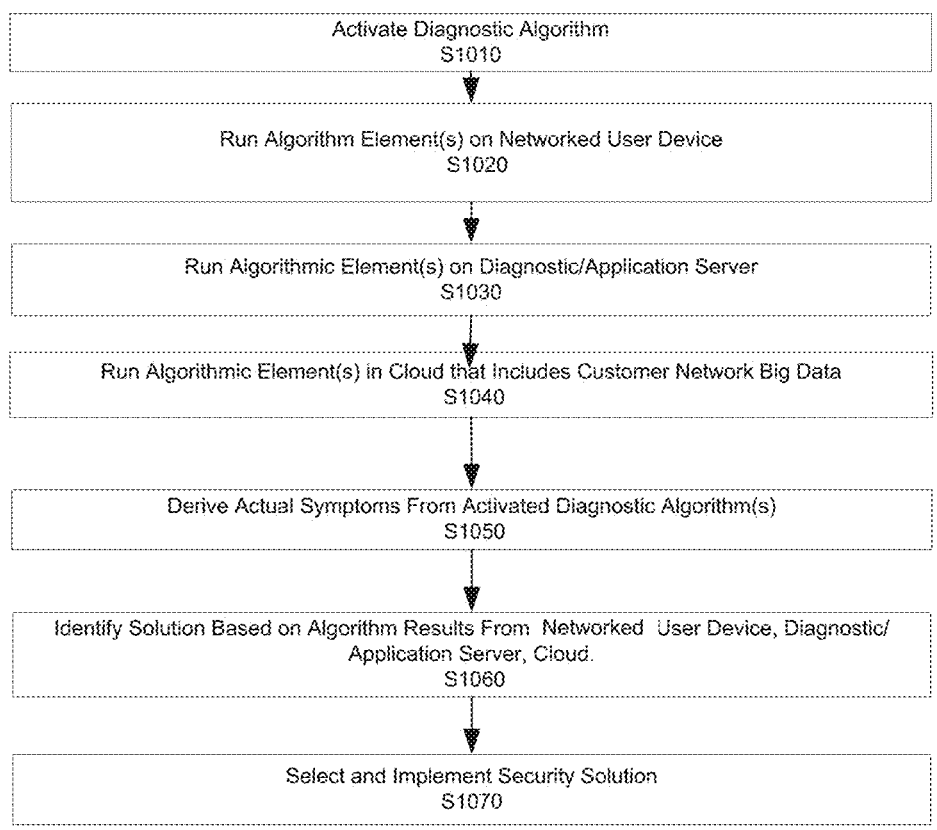
FIG. 10 shows a method for cloud-based communication account security, according to an aspect of the present disclosure.

FIG. 10 shows a method for cloud-based communication account security, according to an aspect of the present disclosure. In FIG. 10, a diagnostic algorithm is activated at S1010. Algorithm elements are run on the networked user device at S1020, and different algorithmic elements are run on a diagnostic/application server at S1030 (such as by searching through databases). Algorithmic elements are run in a cloud that includes user traffic data at S1040. Actual symptoms are derived from the activated diagnostic algorithm elements at S1050. A solution is identified based on the algorithm results from the networked user device, the diagnostic application server, and the cloud, at S1060, and the security solution is selected and implemented at S1070.

Figure 11:
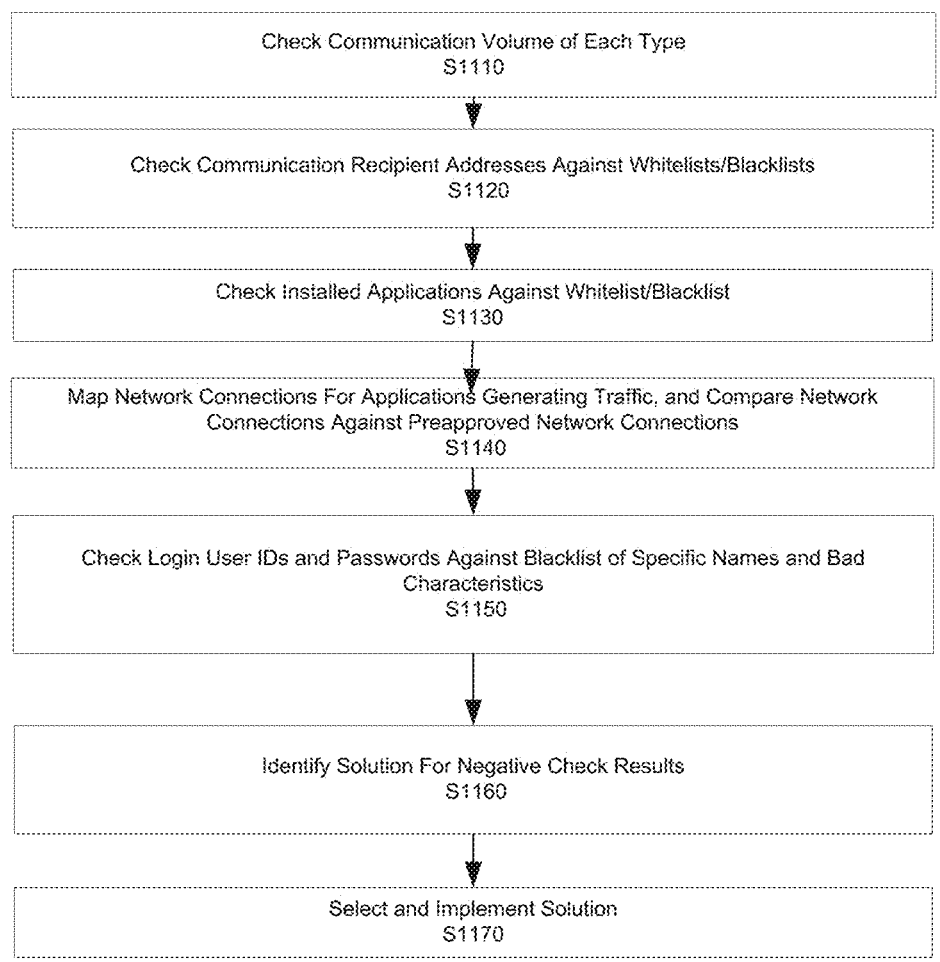
FIG. 11 shows a method for cloud-based communication account security, according to an aspect of the present disclosure.

FIG. 11 shows a method for cloud-based communication account security, according to an aspect of the present disclosure. In FIG. 11, volume(s) of communications of different types are checked at S1110. Types of communications include generically phone calls, emails, text messages, social media posts, and other known types of communications. However, users of smart communication devices, may have multiple email accounts, text messaging accounts, etc. Therefore, at S1110, communication volumes for each type and each account may be separately checked.

At S1120, communication recipient addresses are checked against whitelists (known safe addresses) and blacklists (known unsafe addresses). At S1130, installed applications on a user smart device are checked against whitelists (known safe applications) and blacklists (known unsafe applications).

At S1140, network connections for applications generating traffic are mapped, and compared against preapproved network connections. In S1140, the check is to make sure that any application generating traffic is likely to have been authorized by a user with full knowledge of the communications that are ultimately mapped. If an application is generating traffic without apparent preapproval of the user, then the mapping at S1140 will result in the discovery of the unapproved generated traffic.

At S1150, login user IDs and passwords are checked against blacklists of specific names, as well as a set of rules for user ID and password characteristics that are considered vulnerable. For example, passwords such as abc123, abcd1234, or any simple username combinations involving a user's first or last name are typically considered vulnerable.

At S1160, a search and identification is performed for solutions to any negative check results from S1110, 1120, S1130, S1140 and S1150. At S1170, a solution is selected and implemented.

FIG. 12 shows a call flow for cloud-based communication account security, according to an aspect of the present disclosure. In FIG. 12, an activity on a smartphone 1210 occurs at S1211. The activity at S1211 is a check by an installed security application that checks for compromised accounts. The security application may be preinstalled. At S1212, the smartphone 1210 sends a request to diagnostic server 1230 with symptoms identified by the installed security application. At S1213, the diagnostic server 1230 sends portions of a diagnostic algorithm to smartphone 1210 to check for actual or additional symptoms not discovered by the installed security application. Any results of actual or additional symptoms are sent back to the diagnostic server 1230 from the smartphone 1210. At S1213, the diagnostic server 1230 sends portions of a diagnostic algorithm to search through an internal network cloud 1240 of user data and internal solutions to any problems identified. At S1215, the diagnostic server 1230 sends a search request to search the public internet 1250 for evidence of compromises of the user's accounts, as well as for any solutions to any problems identified. At S1216, the diagnostic server 1230 sends instructions to the installed security application to fix or otherwise address likely sources of symptoms discovered by the diagnostic algorithm. The instructions may also require cooperation of the user, such as approval to remove or reinstall an application.

Though FIG. 12 represents one call flow, there are multiple different ways that the system can be triggered. In some cases, a security check may first originate in the network due to the fact that resource intensive algorithms can be run in heavy-weight computing environments. Algorithms requiring interaction or data stored on the device may run in a lightweight on-demand manner to save bandwidth, battery life, and resources. As previously mentioned, the system can also be triggered by customer care representatives or analysts attempting to solve a specific problem or user request.

Accordingly, cloud-based communication account security enables an entity to identify and resolve problems on user devices, even when the user and a customer care agent do not necessarily have a proper initial understanding of the problem. As described herein, a service provider can resolve problems that are either new or that are previously identified, using algorithms designed to detect particular symptoms. In this way, even an initial report of a problem from a user can be used as the basis for resolving the problem for other users in similar circumstances.

Although cloud-based communication account security has been described with reference to several exemplary embodiments, it is understood that the words that have been used are words of description and illustration, rather than words of limitation. Changes may be made within the purview of the appended claims, as presently stated and as amended, without departing from the scope and spirit of cloud-based communication account security in its aspects. Although cloud-based communication account security has been described with reference to particular means, materials and embodiments, cloud-based communication account security is not intended to be limited to the particulars disclosed; rather cloud-based communication account security extends to all functionally equivalent structures, methods, and uses such as are within the scope of the appended claims.

For example, although the disclosure herein describes providing solutions to problems, it may be possible that no good solution is available for one or more known problems. An automated cloud-based communication account security system may still be able to explain causes of anomalies to customers, so as to help ensure that users avoid compromising their devices in the future.

Additionally, the application describes human agents at workstations and automated agents on user devices and on servers. However, an automated system as described herein may be largely or even entirely provided in the cloud, so that a user contacting a customer care address is routed to a cloud-based communication account security system. The security system may derive symptoms from the user, obtain information about a device, applications, and even about the user, and search a private cloud of the network provider for communications data relating to most or even all of the users communications involving a particular account, a particular device, or a particular application on a device. In this way, cloud-based communication account security can identify actual symptoms and actual problems that may not be within the view of the user.

Additionally, the interaction between a user and the cloud-based communication account security system may involve natural language processing, so that keywords relevant to the security domain are extracted from an incoming question/inquiry. In this way, communications to a general purpose customer care address may be internally routed to the cloud-based communications account security based on input from the user. This input from the user may include the user's description of symptoms that prompt the user to initiate the contact, and the cloud-based security system may automate the process so that the user does not have to provide much more information other than, perhaps, authorizations for the system to access user data including third-party applications on the user device. The diagnostic algorithm can be selected based on the natural language selection of the security keywords.

Further, as noted herein, identification of information correlated to a particular problem may result in a service provider notifying other users of potential vulnerabilities. In this way, a single user reporting a security problem may result in tens, hundreds, or even thousands of other users being notified of fixes before they are otherwise affected by the security problem. These notifications, updates, or other fixes may be provided to other users based on device characteristics, application characteristics, and/or user characteristics etc. that are shared with the user initially reporting the problem.

We note that the system outlined throughout will not only work for security related issues, but more general problems as well. It is common for a user to believe they have some type of security problem when in reality they do not. For example, if a user has a high bill due to data overage fees, the system, using both network information and device specific information, can identify the actual application that caused the data overage. Though not necessarily a security problem, this example shows that the system can expand to any generic problem that the user may have with their connected device.

Further, an on-device security agent is described herein. However, even when an on-device security agent is provided, the network itself may be where security problems are identified, and the on-device security agent may be used to assist an in-network security system to resolve the security problems on the user device. As described, an on-device agent can map network connections to applications that generate the traffic on the network connections. In this way, a user may be notified by the on-device security agent before the user even realizes that a security problem is present on their user device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by re efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In accordance with an aspect of the present disclosure, a method of providing user service includes receiving, over a network, a request to resolve a problem relating to a networked user device. The method also includes selecting based on the request, one of multiple available diagnostic algorithms to analyze user data in a user account to identify symptoms of the problem and diagnose a cause of the symptoms identified.

In accordance with another aspect of the present disclosure, the method also includes analyzing, using a diagnostic algorithm selected, the user data related to the user's account to identify symptoms of the problem. The method also includes identifying symptoms of the problem.

In accordance with still another aspect of the present disclosure, the method further includes diagnosing a cause of the symptoms identified.

In accordance with yet another aspect of the present disclosure, the method further includes searching to identify a solution to resolve the cause of the problem diagnosed. The method also includes providing a user using the user device with the solution to resolve the problem.

In accordance with another aspect of the present disclosure, the method also includes identifying applications that are generating traffic on the networked user device to identify the cause of the problem. The method also includes mapping network connections for the applications that are generating traffic on the networked user device. The method also includes comparing mapped network connections on the networked user device with preapproved network connections for the networked user device to diagnose unapproved mapped network connections as the cause of the symptoms identified. The solution to resolve the cause of the symptoms identified is based on the diagnosis of the unapproved mapped network connections as the cause of the problem.

In accordance with still another aspect of the present disclosure, the diagnostic algorithm selected analyzes user data stored by a service provider separate from the user device.

In accordance with yet another aspect of the present disclosure, the diagnostic algorithm selected identifies symptoms of malware, and diagnoses malware as the cause of the symptoms identified.

In accordance with another aspect of the present disclosure, the diagnostic algorithm selected determines a probability that an application installed on the networked user device is unapproved, and diagnoses an unapproved application as the cause of the symptoms identified.

In accordance with yet another aspect of the present disclosure, the diagnostic algorithm selected identifies unauthorized communications as symptoms identified, and diagnoses an application responsible for sending the unauthorized communications as the cause of the symptoms identified.

In accordance with still another aspect of the present disclosure, the diagnostic algorithm selected determines a probability that a login for an application has been compromised, and diagnoses a compromised login as the cause of the symptoms identified.

In accordance with another aspect of the present disclosure, the diagnostic algorithm selected identifies an amount of traffic volume involving the networked user device as a symptom identified, and diagnoses an application responsible for traffic as the cause of the symptom identified.

In accordance with yet another aspect of the present disclosure, the diagnostic algorithm selected identifies communication addresses to which communications are sent or from which communications are received by the networked user device as symptoms identified, and diagnoses an application responsible for traffic to or from the communication addresses as the cause of the symptoms identified.

In accordance with another aspect of the present disclosure, as new diagnostic algorithms are developed, they may be added to the system. As new problems and symptoms are identified, new diagnostic algorithms may be developed.

In accordance with still another aspect of the present disclosure, the request is received from a preinstalled application that automatically identifies symptoms which warrant resolution using a diagnostic algorithm. The diagnostic algorithm selected is selected based on the symptoms received from the preinstalled application.

In accordance with another aspect of the present disclosure, the request is received from a user using the user device and comprises symptoms provided by the user. The diagnostic algorithm selected is selected based on the symptoms provided by the user.

In accordance with yet another aspect of the present disclosure, the user data is stored in a cloud and includes records of communications to and from the networked user device for a period.

In accordance with still another aspect of the present disclosure, natural language processing is used to extract and identify keywords from the user as symptoms.

In accordance with another aspect of the present disclosure, the symptoms provided by the user may be different than the symptoms identified by the diagnostic algorithm selected.

In accordance with yet another aspect of the present disclosure, the method further includes identifying other devices which are vulnerable to the same problem diagnosed. The method also includes notifying the other devices of the problem and the solution.

In accordance with an aspect of the present disclosure, a tangible computer readable storage medium stores a computer program for providing user service, the computer program, when executed by a processor, causing a computer apparatus to perform a process. The process includes receiving, over a network, a request to resolve a problem relating to a networked user device. The process also includes selecting, based on the request, one of multiple available diagnostic algorithms to analyze user data in a user account to identify symptoms of the problem and diagnose a cause of the symptoms identified.

In accordance with an aspect of the present disclosure, a computer apparatus includes a memory that stores instructions for providing user service, and a processor that executes the instructions. When executed by the processor, the instructions cause the processor to perform operations. The operations include receiving, over a network, a request to resolve a problem relating to a networked user device. The operations also include selecting, based on the request, one of multiple available diagnostic algorithms to analyze user data in a user account to identify symptoms of the problem and diagnose a cause of the symptoms identified.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, by a computer system comprising a processor, over a network, a request to resolve a problem relating to a user device, wherein the request is received from one of a preinstalled application associated with the user device or from a user of the user device, and wherein the request comprises initial symptoms provided by the one of the preinstalled application associated with the user device or the user of the user device;
   selecting, by the processor, based at least in part on the initial symptoms of the request provided by the one of the preinstalled application associated with the user device or the user of the user device, a diagnostic algorithm of a plurality of diagnostic algorithms to analyze data associated with the user device to identify symptoms of the problem and diagnose a cause of the symptoms identified, wherein the diagnostic algorithm, when executed by the processor, causes the processor to perform operations comprising
      identifying applications that are generating traffic on the user device,
      mapping network connections for the applications that are generating traffic on the user device, and
         comparing the network connections for the applications that are mapped with preapproved network connections for the user device to diagnose at least one unapproved mapped network connection as the cause of the symptoms identified; and
   searching, by the processor, to identify a solution to resolve the cause of the symptoms identified, wherein the solution to resolve the cause of the symptoms identified is based at least in part on diagnosis of the at least one unapproved mapped network connection as the cause of the symptoms identified.

2. The method of claim 1, wherein at least one of the symptoms identified by the diagnostic algorithm is different from at least one of the initial symptoms provided by the one of the preinstalled application associated with the user device or the user of the user device.

3. The method of claim 1, wherein the data associated with the user device comprises at least one of service provider data associated with the user device, data from at least one of the applications associated with the user device, or data from third party sources.

4. The method of claim 1, further comprising:
   identifying other devices which are vulnerable to the cause of the symptoms diagnosed; and
   notifying users associated with the other devices of the solution.

5. A tangible computer readable storage medium that stores instructions that, when executed by a processor of a computer system, causes the processor to perform operations comprising:

receiving, over a network, a request to resolve a problem relating to a user device, wherein the request is received from one of a preinstalled application associated with the user device or from a user of the user device, and wherein the request comprises initial symptoms provided by the one of the preinstalled application associated with the user device or the user of the user device;

selecting, based at least in part on the initial symptoms of the request provided by the one of the preinstalled application associated with the user device or the user of the user device, a diagnostic algorithm of a plurality of diagnostic algorithms to analyze data associated with the user device to identify symptoms of the problem and diagnose a cause of the symptoms identified;

identifying, using the diagnostic algorithm, applications that are generating traffic on the user device;

mapping, using the diagnostic algorithm, network connections for the applications that are generating traffic on the user device;

comparing, using the diagnostic algorithm, the network connections for the applications that are mapped with preapproved network connections for the user device to diagnose at least one unapproved mapped network connection as the cause of the symptoms identified; and searching to identify a solution to resolve the cause of the symptoms identified, wherein the solution to resolve the cause of the symptoms identified is based at least in part on diagnosis of the at least one unapproved mapped network connection as the cause of the symptoms identified.

6. The tangible computer readable storage medium of claim 5, wherein at least one of the symptoms identified by the diagnostic algorithm is different from at least one of the initial symptoms provided by the one of the preinstalled application associated with the user device or the user of the user device.

7. The tangible computer readable storage medium of claim 5, wherein the data associated with the user device comprises at least one of service provider data associated with the user device, data from at least one of the applications associated with the user device, or data from third party sources.

8. The tangible computer readable storage medium of claim 5, wherein the operations further comprise:

identifying other devices which are vulnerable to the cause of the symptoms diagnosed; and notifying users associated with the other devices of the solution.

9. A computer system comprising:

a processor; and a memory that stores instructions that, when executed by the processor, cause the processor to perform operations comprising receiving, over a network, a request to resolve a problem relating to a user device, wherein the request is received from one of a preinstalled application associated with the user device or from a user of the user device, and wherein the request comprises initial symptoms provided by the one of the preinstalled application associated with the user device or the user of the user device, selecting, based at least in part on the initial symptoms of the request provided by the one of the preinstalled application associated with the user device or the user of the user device, a diagnostic algorithm of a plurality of diagnostic algorithms to analyze data associated with the user device to identify symptoms of the problem and diagnose a cause of the symptoms identified, identifying, using the diagnostic algorithm, applications that are generating traffic on the user device, mapping, using the diagnostic algorithm, network connections for the applications that are generating traffic on the user device, comparing, using the diagnostic algorithm, the network connections for the applications that are mapped with preapproved network connections for the user device to diagnose at least one unapproved mapped network connection as the cause of the symptoms identified, and searching to identify a solution to resolve the cause of the symptoms identified, wherein the solution to resolve the cause of the symptoms identified is based at least in part on diagnosis of the at least one unapproved mapped network connection as the cause of the symptoms identified.

10. The computer system of claim 9, wherein at least one of the symptoms identified by the diagnostic algorithm is different from at least one of the initial symptoms provided by the one of the preinstalled application associated with the user device or the user of the user device.

11. The computer system of claim 9, wherein the data associated with the user device comprises at least one of service provider data associated with the user device, data from at least one of the applications associated with the user device, or data from third party sources.

* * * * *